US006666648B2

(12) United States Patent
Bernhard et al.

(10) Patent No.: US 6,666,648 B2
(45) Date of Patent: Dec. 23, 2003

(54) DIRECTIONAL ELASTOMERIC COUPLER

(75) Inventors: Andreas P. F. Bernhard, Shelton, CT (US); Michael S. Torok, Hamden, CT (US); Robert C. Moffitt, Seymour, CT (US); Peter F. Lorber, Coventry, CT (US); Geoffrey C. R. Davis, Madison, CT (US); William Arthur Welsh, New Haven, CT (US); Brian E. Wake, South Glastonbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 22 days.

(21) Appl. No.: 10/150,823

(22) Filed: May 17, 2002

(65) Prior Publication Data

US 2003/0215333 A1 Nov. 20, 2003

(51) Int. Cl.⁷ .................. B64C 27/35; B64C 27/615
(52) U.S. Cl. .................. 416/23; 416/134 R; 384/221
(58) Field of Search .................. 416/23, 24, 83, 416/98, 101, 103, 104, 105, 134 A; 384/221

(56) References Cited

U.S. PATENT DOCUMENTS

| 3,292,712 | A | * 12/1966 | Schmidt .................. 416/134 A |
| 5,482,383 | A | 1/1996 | Gantt et al. |
| 5,681,032 | A | 10/1997 | Hofmann |
| 5,741,116 | A | 4/1998 | Hudson |
| 5,860,382 | A | 1/1999 | Hobdy |
| 5,905,212 | A | 5/1999 | Moses et al. |
| 5,915,842 | A | 6/1999 | Redinger |
| 5,957,662 | A | 9/1999 | Aoki et al. |
| 5,961,290 | A | 10/1999 | Aoki et al. |
| 6,135,713 | A | 10/2000 | Domzalski et al. |
| 6,168,144 | B1 | 1/2001 | Bruehl |
| 6,168,379 | B1 | 1/2001 | Bauer |
| 6,190,132 | B1 | 2/2001 | Yamakawa et al. |
| 6,200,096 | B1 | 3/2001 | Kohlhepp |
| 6,224,047 | B1 | 5/2001 | Gwinn |
| 6,231,013 | B1 | 5/2001 | Jaenker |
| 6,231,308 | B1 | 5/2001 | Kondo et al. |

OTHER PUBLICATIONS

Narramore, J.C., McCroskey, W.J. & Noonan, K.W., Design and Evaluation of Multi–Element Airfoils for Rotorcraft, Presented at the American Helicopter Society 55th Annual Forum, May 25–27, 1999, Montreal, Quebec, Canada, American Helicopter Society, Inc. 1999.

Chaffin, Sr., Mark S., Application of Adjoint Optimization Method to Multi–Element Rotorcraft Airfoils, Presented at the American Helicopter Society Vertical Lift Aircraft Design Conference, San Francisco, CA, American Helicopter Society, Inc. 2000.

(List continued on next page.)

*Primary Examiner*—Edward K. Look
*Assistant Examiner*—Richard A. Edgar
(74) *Attorney, Agent, or Firm*—Carlson, Gaskey & Olds

(57) ABSTRACT

An elastomeric coupler assembly having a helical elastomeric bearing movably supports an active slat relative to a main element. An inner elastomeric coupler assembly and an outer elastomeric coupler assembly support the slat therebetween. Centrifugal force operates to drive the slat to a first position and an actuator rod operates in tension to pull upon the inner elastomeric coupler assembly to drive the slat in opposition to the centrifugal force to a second position. The helical elastomeric bearing is layered such that it defines a section of a circular helix. The circular helix provides a coupling, which converts a linear input parallel to a virtual hinge axis into a rotary output to pitch the slat. In operation, centrifugal force operates to slide the slat outboard toward the blade tip such that the attached slat moves elastomerically along the helical arc of the helical elastomeric bearing to rotate the slat nose down. To retract the slat, the actuator operates to place the actuator rod under tension to pull upon the active member and retract the slat in opposition to centrifugal force.

34 Claims, 10 Drawing Sheets

OTHER PUBLICATIONS

Noonan, Kevin W., Evaluation of Mo del Helicopter Main Rotor Blade With Slotted Airfoils at the Top, Presented at the American Helicopter Society 55th Annual Forum, May 25–27, 1999, Montreal, Quebec, Canada, American Helicopter Society, Inc. 1999.

Ham, Norman D., Helicopter Individual–Blade–Co ntrol and Its Applications, Presented at the 39th Annual Forum of the American Helic opter Society, May 9–11, 1983, St. Louis, MO, American Helicopter Society, Inc. 1983.

Kunze, Oliver, Arnold, Uwe T.P. & Waaske, Stefan, Development an Design of and Individual Blade Control System for the Sikorsky CH–53G Helicopter, Presented at the American Helicopter Society 55th Annual Forum, May 25–27, 1999, Montreal, Quebec, Canada, American Helicopter Society, Inc. 1999.

Bernhard, Andreas P.F. & Chopra, Inderjit, Development of a Smart Moving–Blade–Tip and an Active–Twist Rotor Blade Driven by a Piezo–Induced Bending–Torsion Coupled Beam, Presented at the American Helicopter Society 53rd Forum, Apr. 1997, Virginia Beach, VA, American Helicopter Society, Inc. 1997.

Schimke, D., Janker, P., Blaas, A., Kube, R., Schewe, G. & Kebler, CH., Individual Blade Control by Servo–Flap and Blade Root Control a Collaborative Research and Development Programme, Presented at the 23rd European Rotocraft Forum in Dresden, Germany, Sep. 16–18, 1997.

* cited by examiner

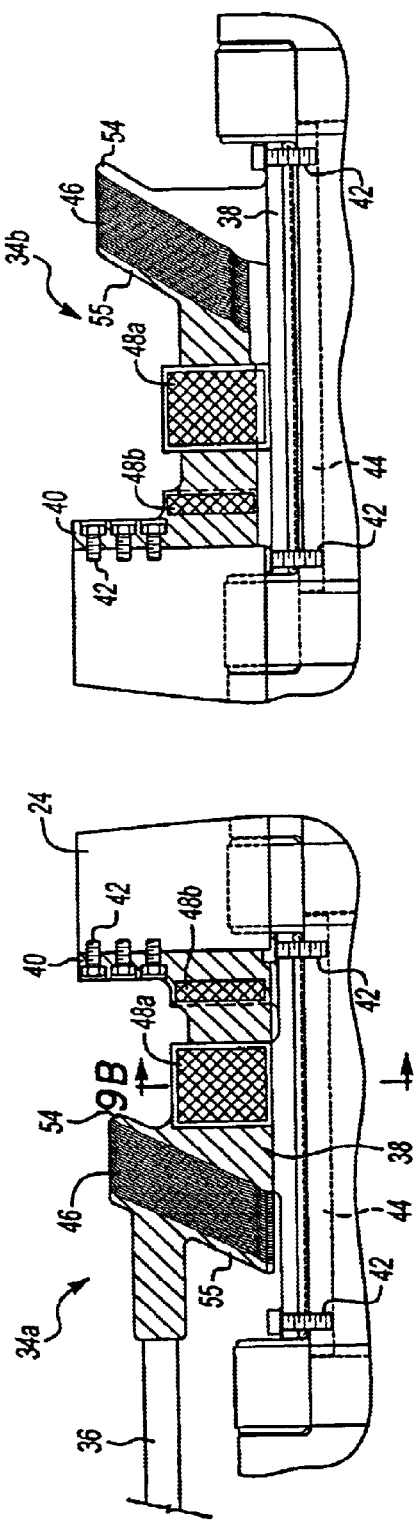
Fig-9A
Fig-9B
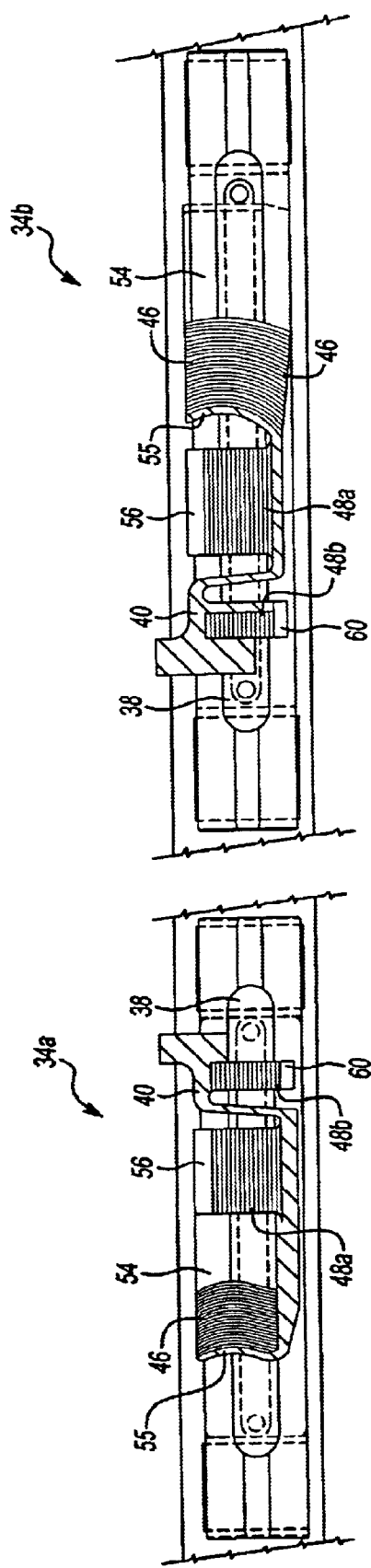
Fig-9C

US 6,666,648 B2

DIRECTIONAL ELASTOMERIC COUPLER

BACKGROUND OF THE INVENTION

This invention was made with government support under Cooperative Agreement: NCC2-9016 for the Variable Geometry Advanced Rotor Technology program awarded by NASA. The government therefore has certain rights in this invention.

The present invention relates to an elastomeric coupler assembly, and more particularly to a reversible elastomeric coupler assembly, which converts an axial displacement input into a rotary output.

Multi-element airfoils are in common use on fixed wing aircraft. Such applications, however, are either in a fixed configuration or activate at relatively slow rates. In conventional applications the aerodynamic flow environment is steady or quasi-steady.

Actuators for multi-element airfoils, such as aircraft leading edge slats, are relatively well known. Such actuators commonly employ a mechanical linkage or track, which provides for translation and pitching of the slat relative to the wing. Aircraft slats are deployed from a leading edge of a wing and may be powered between an extended and a retracted position. As the wing is fixed and maintains a fixed relationship with the aerodynamic flow environment, actuation of the slat is relatively straightforward. Moreover, the speed of slat actuation is of little concern, as the slats are commonly employed for distinct flight conditions such as landing and takeoff.

Multi-element airfoil application to rotary-wing aircraft has concentrated upon the development of fixed elements, as actuation of an active element upon a rotor blade provides multiple complications. Such complications include withstanding the high forces upon the mechanical connection between the fixed element and the movable element, and the requirement for high bandwith and high load actuation for slat deployment and retraction. It is further desirable that the coupler be of light weight, while providing the capacity to actuate the movable member multiple times within a single rotor revolution without concern for rotor blade azimuth position. Such requirements are without correlation in a conventional fixed wing multi-element airfoil.

Accordingly, it is desirable to provide for the actuation of a movable element that overcomes the many complications inherently associated with a rotary-wing application.

SUMMARY OF THE INVENTION

The elastomeric coupler assembly, according to the present invention, movably supports an active slat relative to a main element. An inner elastomeric coupler assembly and an outer elastomeric coupler assembly support the slat therebetween. An actuator rod extends within the main element, from the blade root portion to the inner elastomeric coupler assembly, to actuate the slat. Centrifugal force operates to drive the slat to a first position and the actuator rod operates in tension to pull upon the inner elastomeric coupler assembly to drive the slat in opposition to the centrifugal force to a second position.

Each elastomeric coupler assembly includes a grounding member and an active member. The grounding member is fixed to the main element. The active member supports the slat. The active member is movably mounted to the grounding member through a helical elastomeric bearing, and a first and second elastomeric support bearing.

The elastomeric bearings include a plurality of shear deformable elastomeric layers attached between high stiffness shims, which act as geometric constraint layers. The elastomeric bearings support rotation of the slat about a virtual hinge axis. The slat rotates and translates relative the main element. One elastomeric support bearing operates to carry the nominal upward lift upon the slat, while the second elastomeric support bearing operates to support the slat in the event that there is a download on the slat. Download may occur when the outboard portion of the main element operates at a negative angle of attack, i.e., when the outboard portion of the blade "digs-in".

The helical elastomeric bearing is layered such that it defines a section of a circular helix, which encircles the virtual hinge axis. The helical bearing acts as a two degree of freedom coupler, which in the present embodiment converts a linear input parallel to the virtual hinge axis into a rotary output about that axis. A force applied to the active member results in additive incremental shear deformation of the elastomeric layers. The shear deformation is constrained by the high stiffness helical shims and consequently the active member is guided along a translation and rotation trajectory defined by the helical structure of the layered bearing. The helical bearing is a reversible coupler, in that a torque applied to the active member, forcing rotation of said member, will result in a coupled translation of the active element, as defined by the helical geometry. Virtually any coupling between linear or rotary degrees of freedom will benefit from the present invention.

In operation, centrifugal force operates to slide the slat outboard toward the blade tip. The elastomeric support bearings of the elastomeric coupler assemblies provide minimal shear resistance to this sliding movement. That is, the support bearings provide independent degrees of freedom in slat rotation and translation. In the helical elastomeric bearings, the rotation and translation degrees of freedom are not independent, because the high stiffness shim layers are helical and thereby constrain the elastomeric deformation of the elastomeric shear deformable layers to a predetermined coupled rotation about the virtual axis and spanwise translation. The active member of the helical bearing moves relative to the grounding member by virtue of successive shear of the elastomeric layers along a helical path between a support ramp and a mating ramp.

Outboard sliding of the slat is accommodated by the active member and the attached slat moving elastomerically along the helical arc of the helical elastomeric bearing, such that the slat rotates nose down. This arrangement negates the need for a safety interlock as in the event of a hardware/software failure, an actuator need only be vented and the slat will achieve its deployed position. Moreover, as centrifugal force operates to drive the slat to a deployed condition the slat requires powered activation for only one direction. Physical "stops" limit the motion envelope of the slat.

To retract the slat, the actuator operates to pull the actuator rod and translate the active member inboard. As the active member is translated inboard, the helical bearing structure forces the slat to rotate nose up. The helical coupling induced rotation of the active member relative to the grounding member retracts the slat into the nose up position. Preferably, the controller controls the actuator to drive the slat to a desired position under prescribed or active control.

The present invention, therefore, provides a coupler, which advantageously accommodates the high centrifugal forces of a rotary-wing application, while providing high power actuation forces with high rates of deployment and retraction. The coupler is light, yet provides the capacity to actuate the movable element multiple times within a single rotor revolution without concern for rotor blade azimuth position. In addition, no sliding or rolling interface between the movable and fixed element is required. Motion is accomplished through deformation of the constrained elastomers. No lubrication or sealing is required which greatly reduces maintenance requirements and increases reliability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 9A is an expanded view illustrating the elastomeric coupler assemblies of FIG. 8;

FIG. 9C is a rear view of the elastomeric coupler assemblies of FIG. 9A;

DETAILED DESCRIPTION OF THE PREFERRED EMBODIMENT

Figure 1:
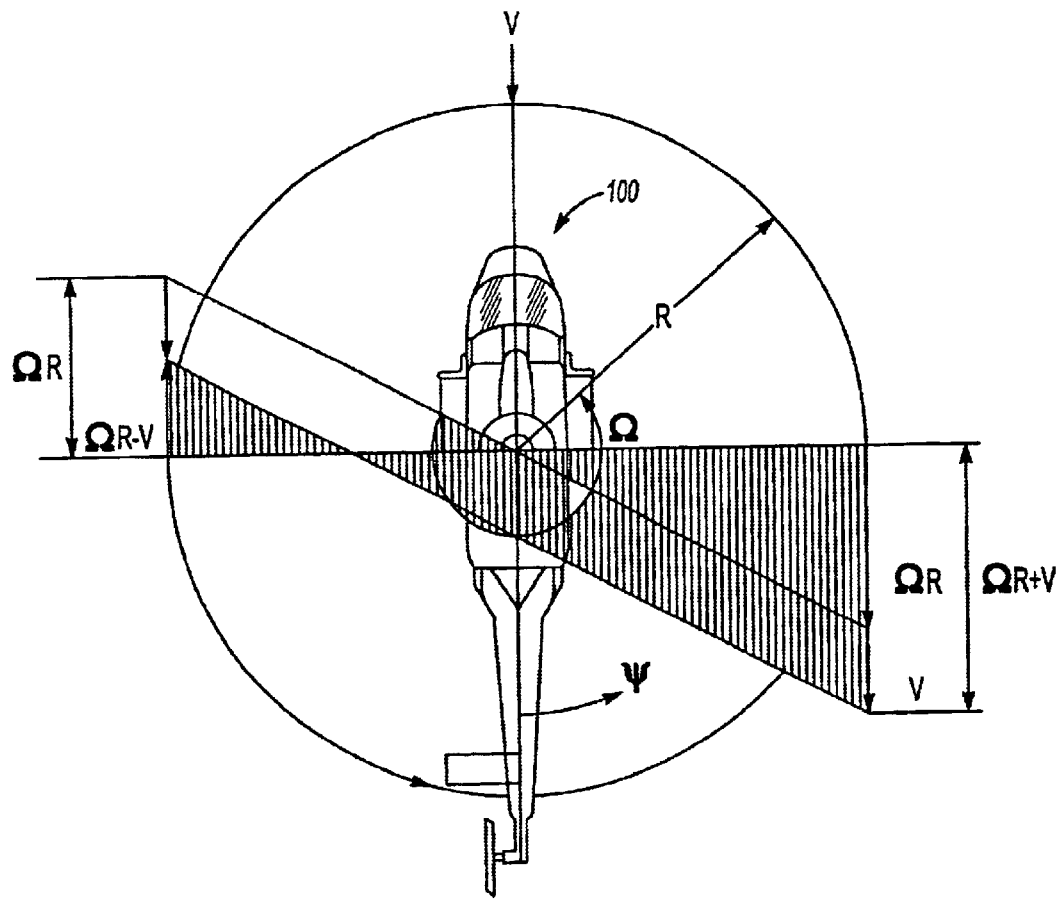
FIG. 1 is a schematic top view illustrating the aerodynamic environment of a helicopter main rotor in forward flight.

FIG. 1 generally illustrates the aerodynamic environment of a helicopter 100 in forward flight having rotor blades of a rotor radius R and rotating at an angular speed Ω, while advancing at a flight velocity V. The speed of the airflow over the advancing blade tip is the rotation based speed ΩR plus the flight velocity V. The airflow over the retreating blade tip is the rotation based speed ΩR minus the flight velocity V. The airspeed difference between the advancing and the retreating blade is, therefore, relatively large.

The azimuth angle Ψ is an angle measured counterclockwise from the tail of the helicopter. It should be understood that, although Ψ is defined, herein, in reference to a counter clockwise rotating rotor, such definition is for convenience only and should not be considered limiting. At an azimuth angle Ψ of 90 degrees, the airspeed of the advancing blade reaches the maximum of ΩR+V. At an azimuth angle Ψ of 270 degrees, the airspeed of the retreating blade reaches the minimum of ΨR−V. The relative airflow at any radial and azimuthal position is obtained by adding a sinusoidal variation of flight speed to the rotational speed component, i.e., V(r, Ψ)=Ωr+V sin(Ψ), where r is the radial position and Ψ is the azimuthal position.

Figure 2A:
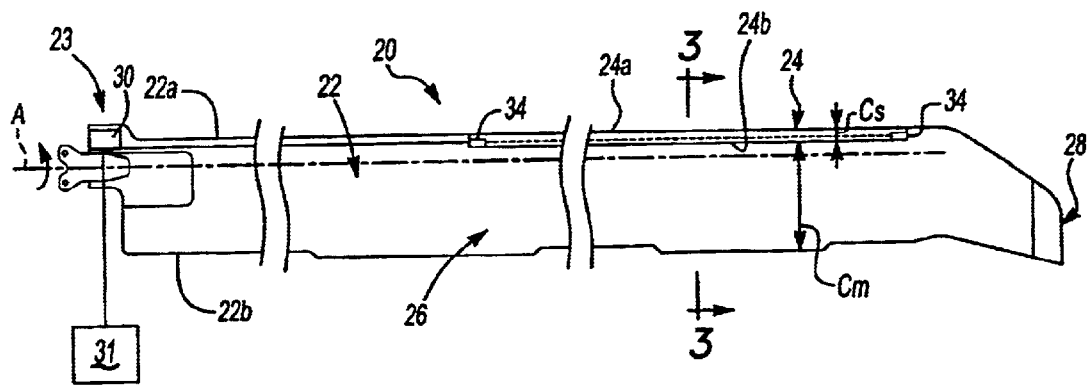
FIG. 2A is a plan view illustrating a multi-element rotor blade according to the present invention.

FIG. 2A is a plan view showing a multi-element rotor blade 20 having a main element 22 and an active slat 24 movable relative to the main element 22. The main element 22 includes a blade root portion 23, a center portion 26, and a blade tip portion 28. Each portion may define a separate airfoil section and it should be understood that, although the illustrated embodiment illustrates a particular design, other rotor blades will benefit from the present invention.

The blade root portion 23 is attached to a rotor head (not shown) for rotating the rotor blade 20 about an axis of rotation A. The main element 22 defines a leading edge 22a and a trailing edge 22b, which are generally parallel to each other. The distance between the leading edge 22a and the trailing edge 22b defines a main element chord length Cm. It should be understood that any rotor blade design will benefit from the present invention.

The slat 24 is mounted parallel to the leading edge 22a and is movable relative thereto by an actuator assembly (illustrated schematically at 30 in FIG. 2A and FIG. 11) or the like about elastomeric coupler assemblies (illustrated schematically at 34). The slat 24 defines a leading edge 24a and a trailing edge 24b, which are generally parallel to each other. A distance between the leading edge 24a and the trailing edge 24b defines a slat chord length Cs.

It should be understood that various actuators and slat mounting arrangements will benefit from the present invention. Actuators such as mechanical, electrical, pneumatic, piezoceramic, hydraulic and the like will also benefit from the present invention. It should also be understood that, although the present invention is described with regard to a multi-element airfoil on a main rotor, many other movable members including airfoil and non-airfoil members will benefit from the present invention. Moreover, other coupling applications will also benefit from the present invention such as, for example, hinges for doors or the like.

Additionally or alternatively, an electronic controller 31 operates an actuator 30, which moves the slat 24. It should be further understood that although the slat in the disclosed embodiment is illustrated along a particular longitudinal length of the main element 22 other lengths and locations for continuous or partial length slats will benefit from the present invention.

Figure 2B:
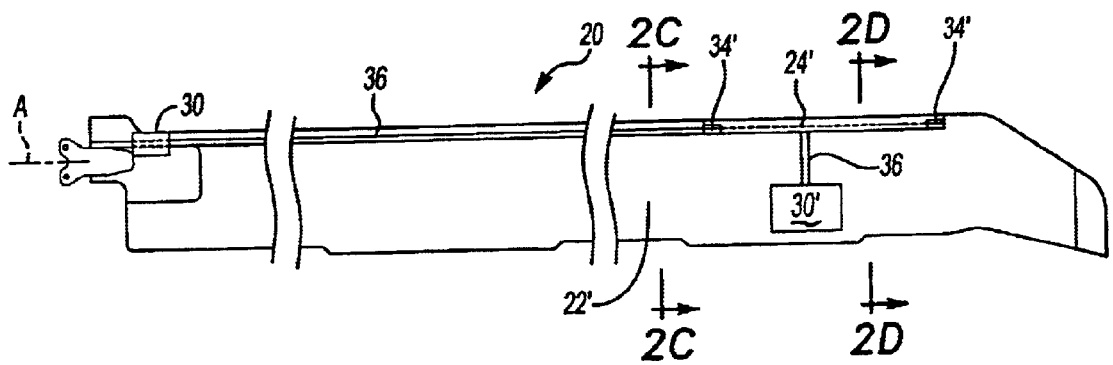
FIG. 2B is a plan view illustrating another multi-element rotor blade according to the present invention.
Figure 2C:
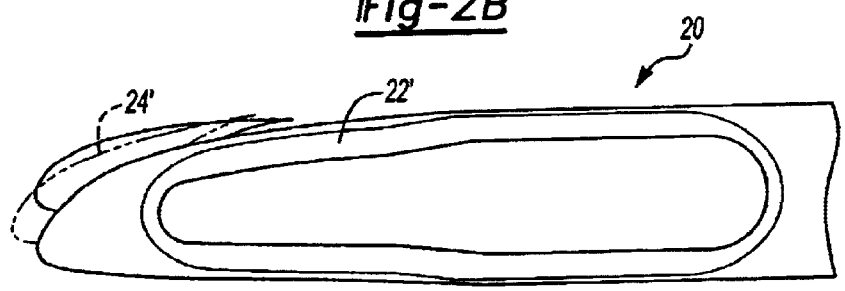
FIG. 2C is a sectional view of the multi-element rotor blade taken along the line 2C—2C of FIG. 2B.
Figure 2D:
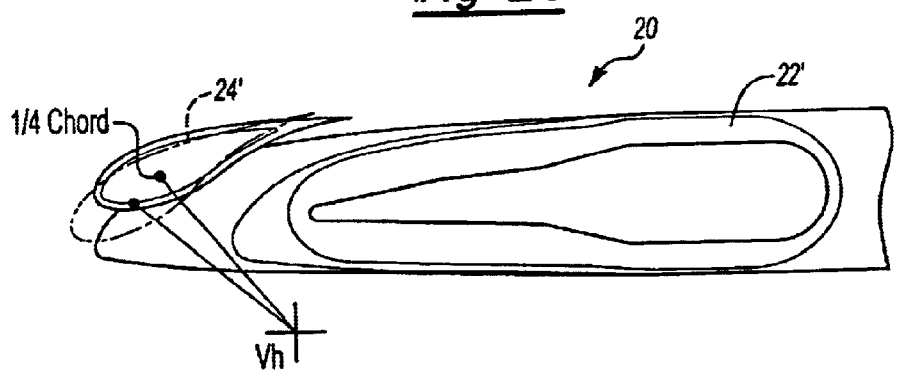
FIG. 2D is a sectional view of the multi-element rotor blade taken along the line 2D—2D of FIG. 2B.
Figure 11:
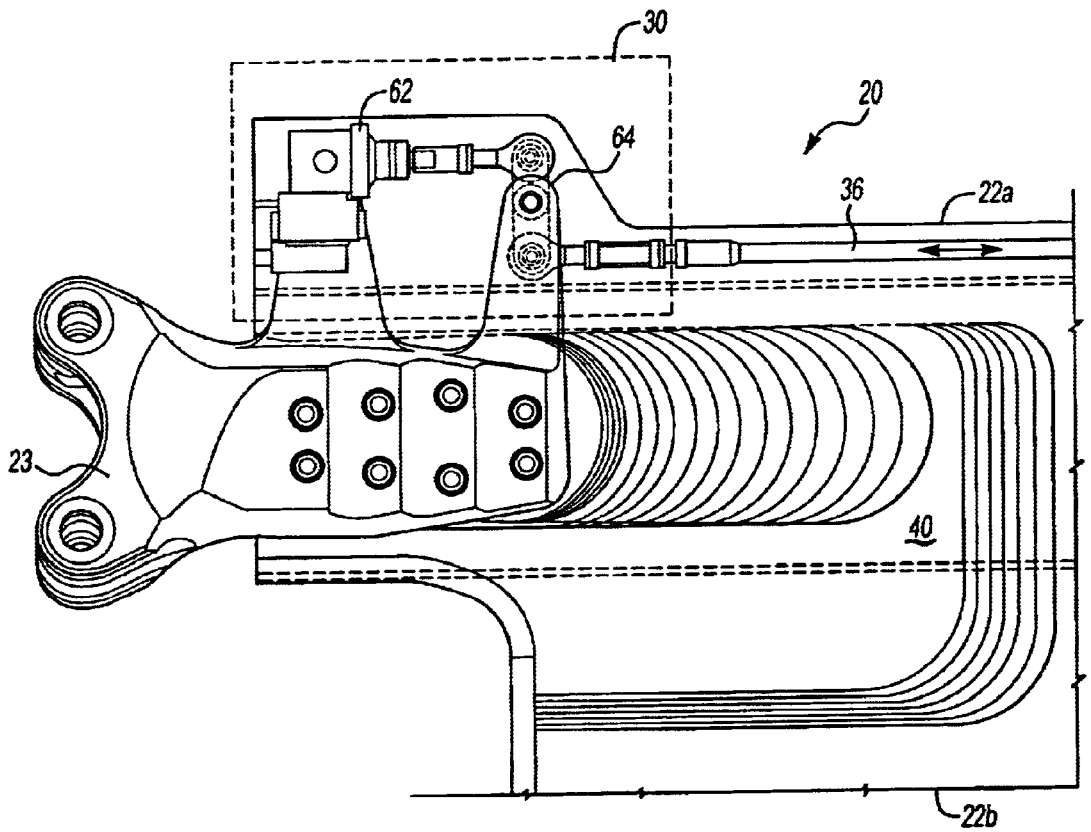
FIG. 11 is an expanded a partial sectional plan view of the root of a multi-element rotor blade illustrating an actuator for the elastomeric coupler assemblies of FIG. 8.

Referring to FIG. 2B, another blade design includes an active slat 24', which preferably spans from the 75%R to 90%R length. A plurality of elastomeric coupler assemblies 34', upon which the slat 24' moves, are mounted to the main element 22' to support rotation and translation of the slat 24' about a virtual hinge point Vh (FIG. 2D). FIG. 2B illustrates another location for actuator 30' mounted inboard slat 24' adjacent the root (FIG. 11).

Figure 3:
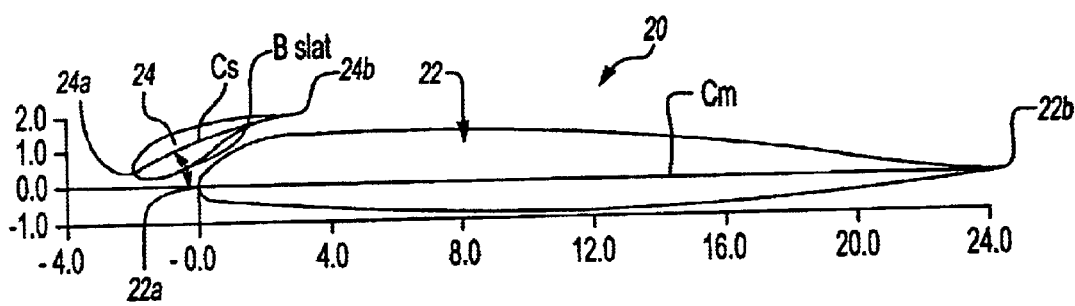
FIG. 3 is a sectional view of the multi-element rotor blade taken along the line 3—3 of FIG. 2A.

Referring to FIG. 3, a sectional view of the rotor blade 20 is illustrated. The leading edge 22a of the main element 22 defines an origin of coordinates (x, y)=(0, 0). The base slat geometry and position preferably provides acceptable (relative to a conventional single element airfoil) maximum coefficient of lift $C_{Lmax}$ at moderate Mach number (retreating blade) while minimizing drag $C_D$ at higher Mach number (advancing blade). Applicant has determined that the slat chord Cs is preferably rotated nose down at an angle (βslat) with respect to the main element chord Cm to achieve desired base position results. In one preferred embodiment, in which the main element chord Cm is 24 inches and the leading edge 22a defines the origin of coordinates, the slat leading edge 24a is at (x, y)=(−1.892", +0.642"), the slat trailing edge is at (+1.677", +1.943") and βslat=20 degrees nose down. The slat quarter chord is at (−0.983", +0.973") and the base position rotation point 32 (shown in FIG. 4A) is at (0.5", 1.0".) It should be understood, however, that other multi-element rotor blades will benefit from the present invention.

Figure 4A:
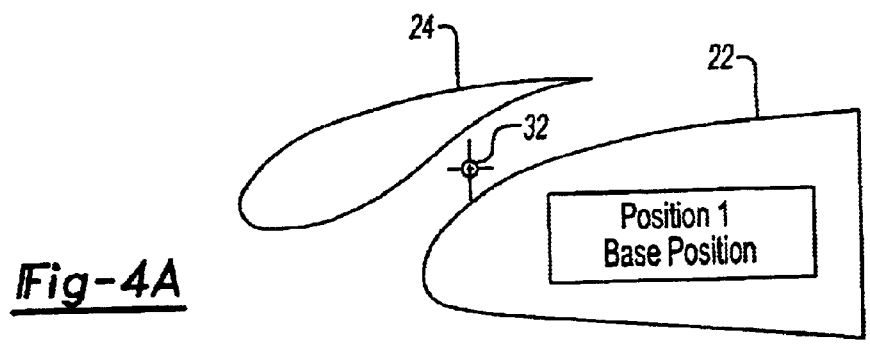
FIGS. 4A–4F are general schematic views of slat positions relative to the main element of a multi-element rotor blade according to the present invention.
Figure 4B:
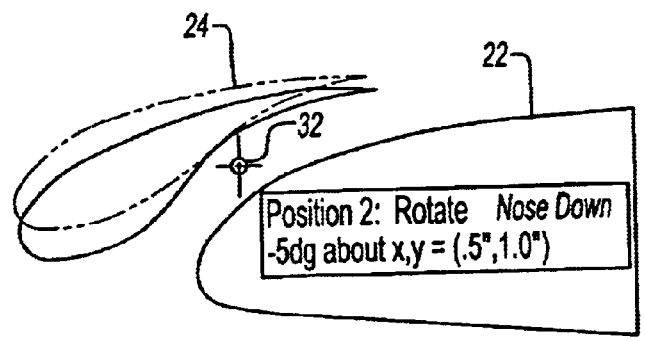

Referring to FIGS. 4A–4F, the slat 24 preferably rotates and translates relative to the main element 22 from a base position (FIG. 4A). The slat 24 preferably rotates about the base position rotation point 32 and translates relative thereto. From the base position rotation point 32, the slat 24 also translates along a translation line t (FIGS. 4D–4F) defined down and away from the main element 22. Preferably, the translation line is orientated to provide slat 24 translation approximately 45 degrees down and away from the main element 22. Positive rotation is slat nose up.

Rotation and translation of the slat 24 may also be accomplished by locating the rotation point 32 outside the contour of the slat 24 and main element 22, as depicted by the virtual hinge point Vh in FIG. 2D. When extended along the span of the slat 24, the virtual hinge point Vh defines an axis H (FIG. 10) generally parallel to both the main element 22 and the slat 24. That is, by locating the virtual hinge point Vh outside the contour of the main element 22' opposite the slat 24', rotation and translation is obtained, similar to that shown in FIGS. 4A–F. It should be understood that other positions will also benefit from the present invention. Furthermore, the slat 24' is continuously movable through an infinite number of positions between at least any two of the representative positions.

The base position (FIG. 4A) provides a compromise between minimum coefficient of drag $C_D$ and maximum coefficient of lift $C_{Lmax}$. Position 2 (FIG. 4B) rotates the slat −5° (nose down) about x, y=(0.5", 1.0"). Position 3 (FIG. 4C) rotates the slat +5° (nose up) about x, y=(0.5", 1.0"). Position 4 (FIG. 4D) provides a −5° rotation with a translation of x, y=(−0.25", −0.25"). Position 5 (FIG. 4E) combines a −2.5° rotation about x, y=(0.5", 1.0") with a translation of x, y=(−0.25", −0.25") from x, y=(0.5", 1.0"). Position 6 (FIG. 4F) combines a −7.5° rotation with a translation of x, y=(−0.45", −0.45") from x, y=(0.5", 1.0") to maximize $C_{Lmax}$ capability. It should be understood that, although discrete positions are disclosed in the illustrated embodiment, other positions will benefit from the present invention. In other words, the slat 24 is continuously movable through an infinite number of positions between maximum positions defined at, preferably, Ψ=90° azimuth position and Ψ=270° azimuth position. The maximum positions are preferably limited by mechanical stops or the like.

Figure 5:
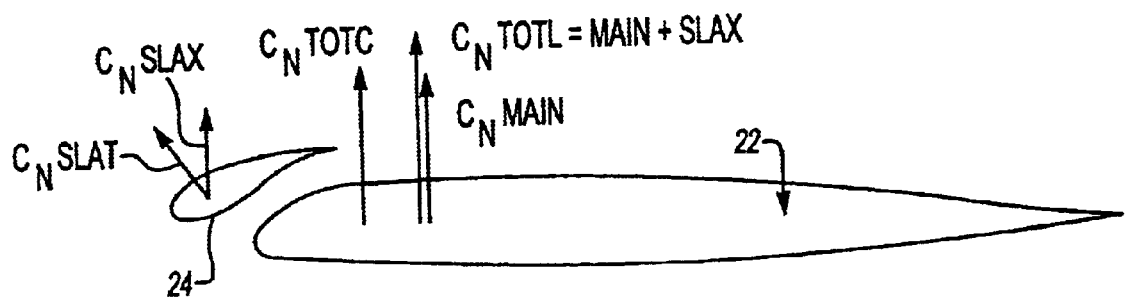
FIG. 5 is a schematic representation of the defined quantities used for the computed section loads of a multi-element rotor blade.

Referring to FIG. 5, defined quantities used for the computed section loads are illustrated. MAIN refers to the loads on the main element only, normalized by the main element chord, with the pitching moment at the main element ¼ chord. SLAT refers to the loads on the slat only, normalized by the slat chord and using the slat ¼ chord as the moment center. TOTC is total airfoil load, now normalized by the total chord ($C_{TOTC}$) and with the moment center at the total airfoil ¼ chord ($x_{1/4}$TOTC). $β_{Slat}$ is the angle of the slat chord with respect to the main element chord.

Locations x and y are referenced to the main element leading edge and parallel and normal to the main element chord line. $x_{1/4}$TOTC is the ¼ chord position of the complete airfoil, and ($x_{Slat\ ¼}$, $y_{Slat\ ¼}$) is the location of the slat ¼ chord. Geometrical parameters for the positions are shown in the Table below.

| Configuration | $β_{Slat}$ | $C_{TOTC}$ | $x_{1/4\ TOTC}$ | $x_{Slat\ 1/4}$ | $y_{Slat\ 1/4}$ |
|---|---|---|---|---|---|
| Main Only | N/A | 24.00" | 6.00" | N/A | N/A |
| Slat 1 | −20° | 25.89" | 4.58" | −0.98" | +0.97" |
| Slat 2 | −25° | 25.89" | 4.58" | −0.98" | +0.84" |
| Slat 3 | −15° | 25.89" | 4.58" | −0.98" | +1.10" |
| Slat 4 | −25° | 26.14" | 4.40" | −1.23" | +0.59" |
| Slat 5 | −22.5° | 26.14" | 4.40" | −1.23" | +0.66" |
| Slat 6 | −27.5° | 26.34" | 4.25" | −1.42" | +0.33" |

Figure 6A:
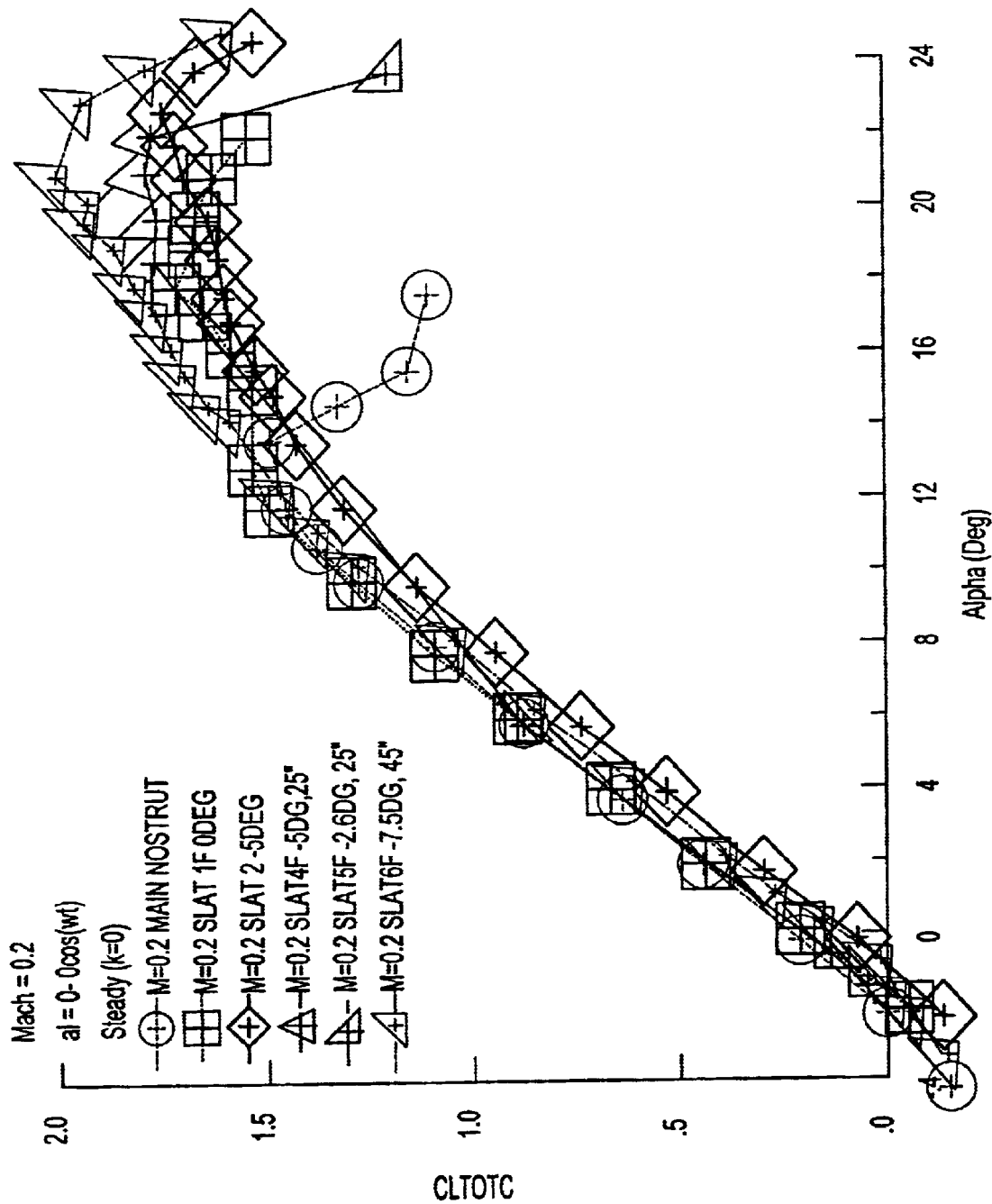
FIG. 6A is a graphical representation of airloads for multiple slat positions relative to the main element of a multi-element rotor blade at a Mach number of 0.2.

Referring to FIG. 6A, airloads for the various configurations at a Mach number of 0.2 are graphed. Mach 0.2 is an example of a retreating blade speed. Slat position 6 (FIG. 4F) consistently provides the highest combined $C_{Lmax}$ ($C_{LTOTC}$) and the latest stall. Steady $C_{Lmax}$ v. Mach number is graphically depicted in FIG. 6B, and steady stall angle v. Mach number is graphically depicted in FIG. 6C. Slat position 6 is therefore the preferred position for the retreating side of the rotor disc.

Figure 4C:
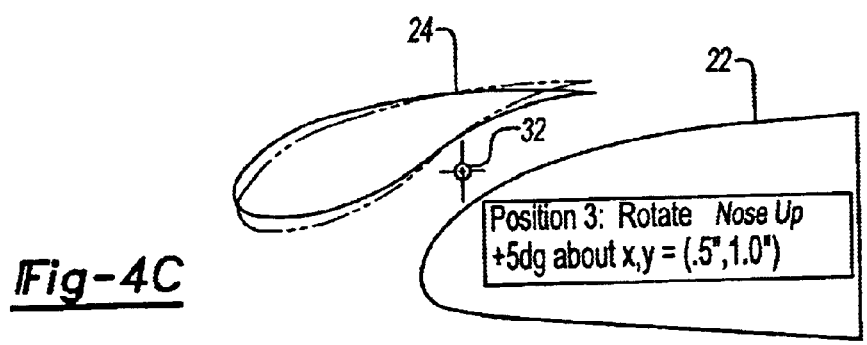
Figure 4D:
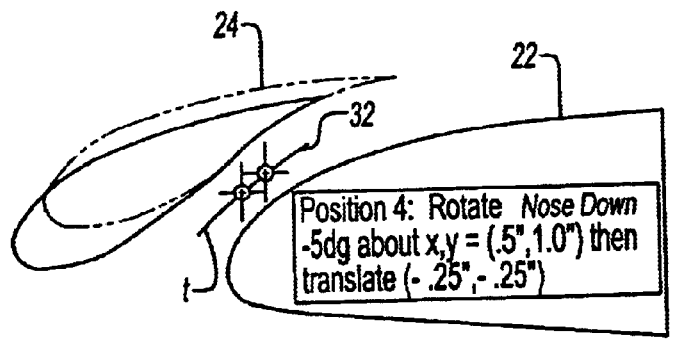
Figure 4E:
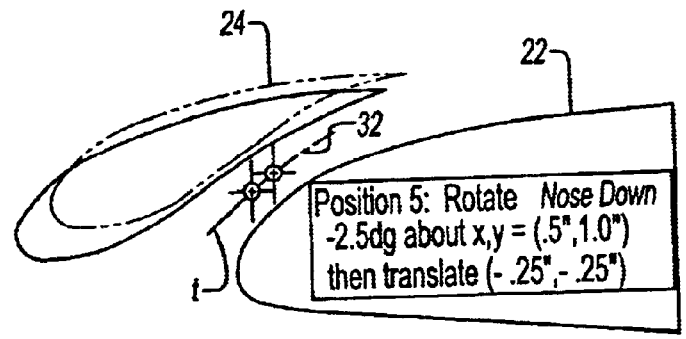
Figure 4F:
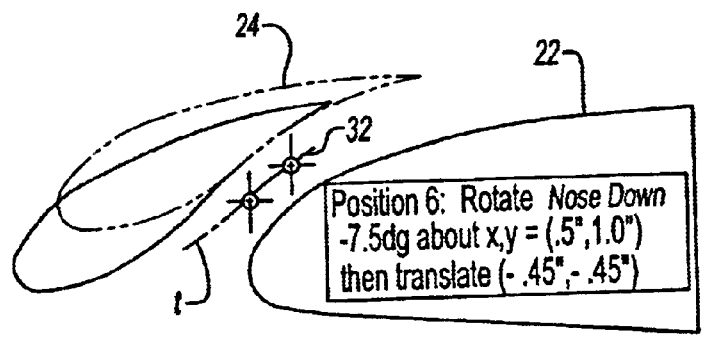
Figure 6B:
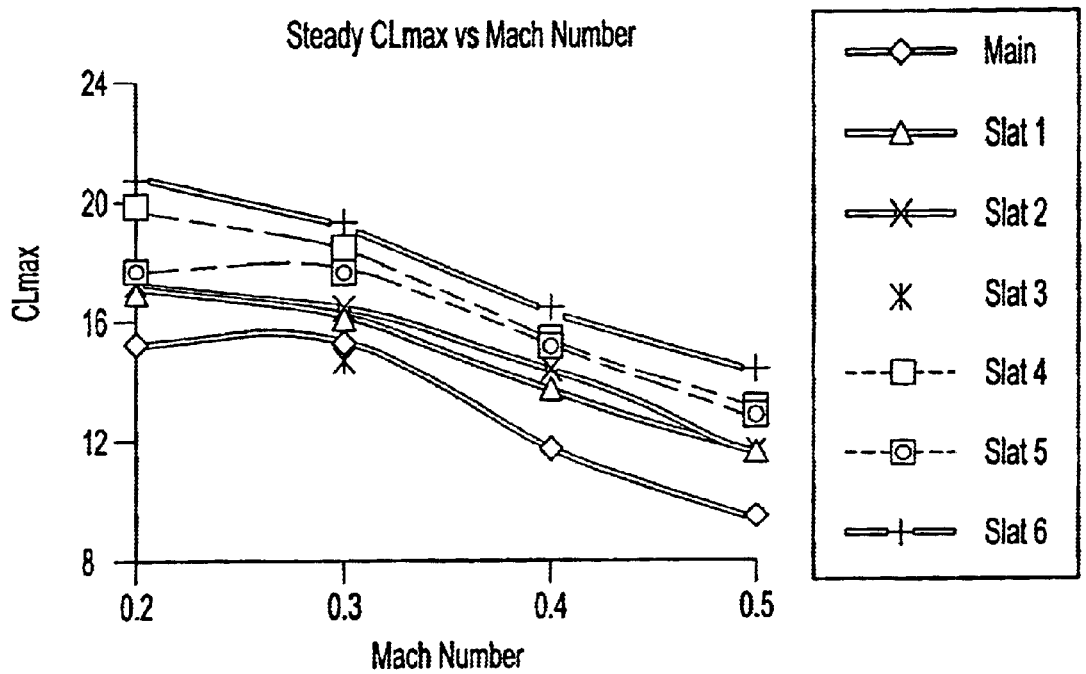
FIG. 6B is a graphical representation of Steady $C_{Lmax}$ v. Mach number for multiple slat positions relative to the main element of a multi-element rotor blade.
Figure 7B:
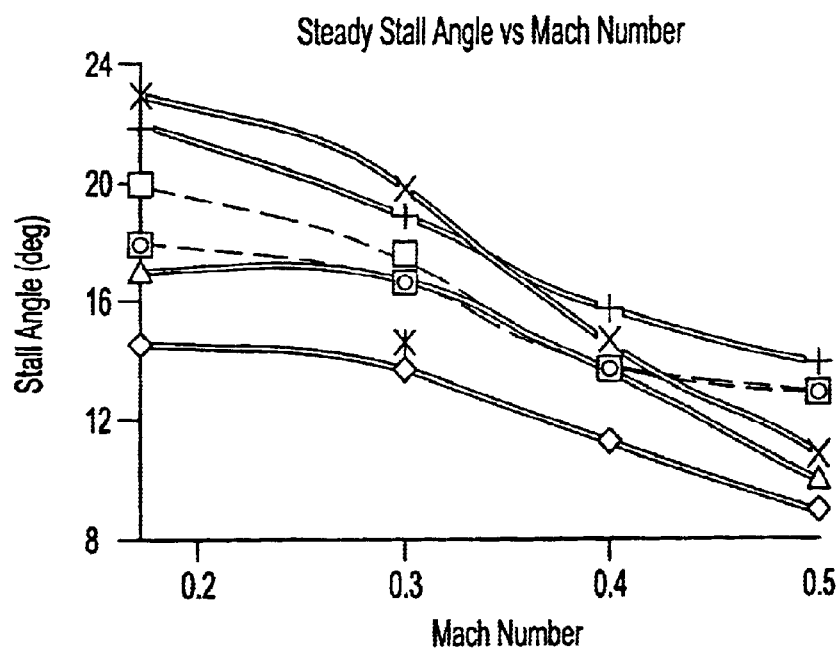
FIG. 7B is a graphical representation of steady stall angle v. Mach number for multiple slat positions relative to the main element of a multi-element rotor blade.
Figure 7A:
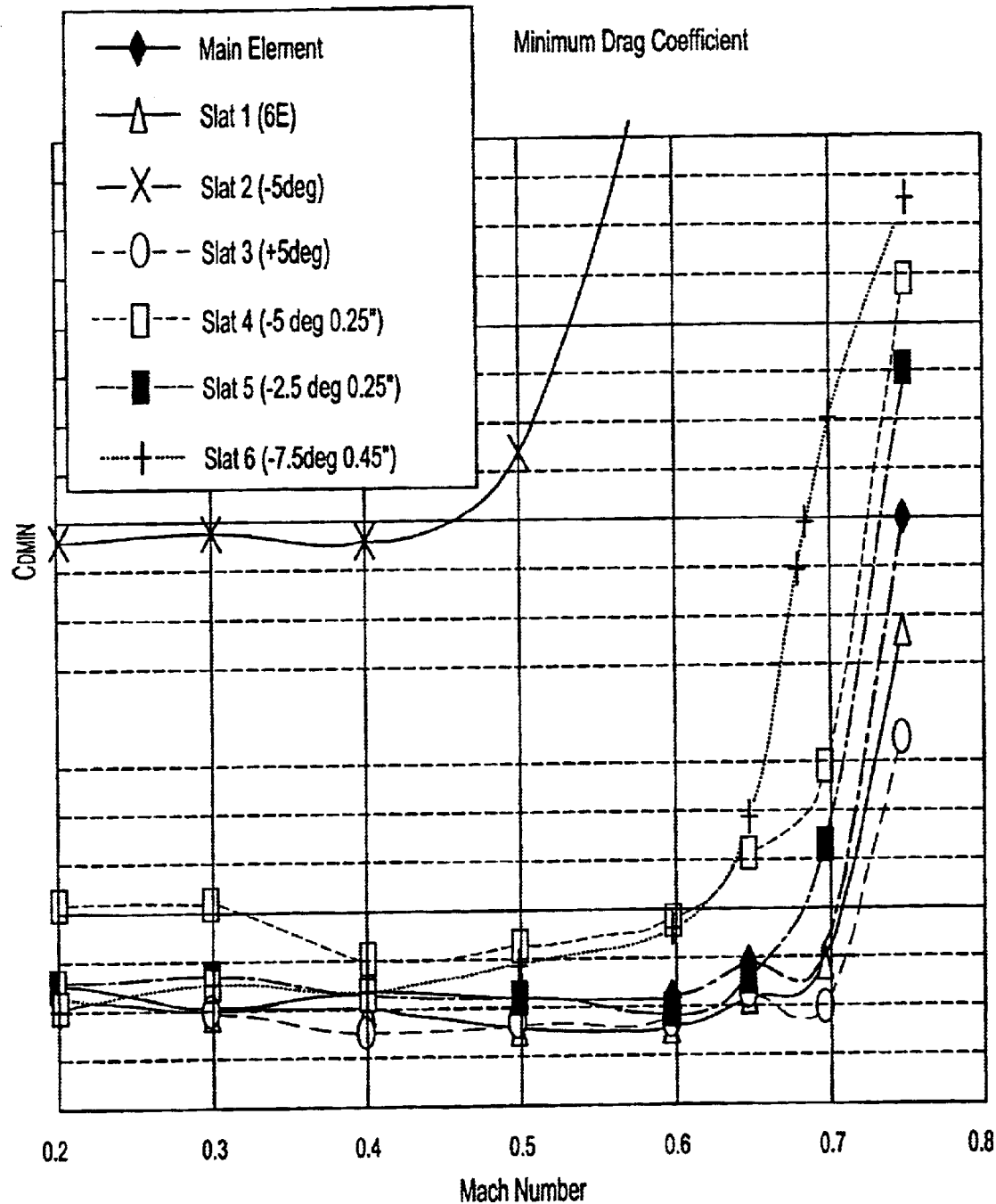
FIG. 7A is a graphical representation of minimum drag coefficients for multiple slat positions relative to the main element of a multi-element rotor blade.

Referring to FIG. 7A, minimum drag coefficients for each slat position are illustrated. The minimum drag values for the main element only, main element with slat position 1, and position 3 are relatively close to each other, rising rapidly only above M=0.75. Position 5 also has similar minimum drag values at a lower Mach number, but exhibits rapid drag rise at M=0.70. Position 3, the only positive rotation slat position, provides the lowest drag at higher Mach numbers relevant for an advancing blade. Slat position 3 is therefore preferred for the advancing side of the rotor disc For the advancing blade, because the airspeed thereof is significantly greater than the retreating blade, applicant has determined that a positive rotation from the base position (position 3; FIG. 4C and FIG. 7A) minimizes drag at low angles of attack, providing a coefficient of drag $C_D$ lower than a conventional single element rotor blade. For the retreating blade, since the airspeed thereof is significantly lower than the advancing blade, Applicant has determined that negative rotation and translation (position 6; FIG. 4F and FIG. 6B) maximizes the coefficient of lift $C_{Lmax}$. Slat position 6 provides an increase in the steady state coefficient of lift by 0.3 to 0.45 and also an improved average lift capability for unsteady motions.

Actuation of the slat can be prescribed for a given aircraft, prescribed in response to a given aircraft at a given flight condition, or actively controlled in that real time sensors, which acquire data and via a computer processing algorithm within controller 31, demand slat position to optimize a defined performance objective. Prescribed motion is open loop; there is no feedback. In other words, a prescribed motion schedule is defined and the slat moves accordingly (although a different prescribed motion may be provided for different flight conditions or loading conditions, etc.—but these are relatively slowly changing conditions).

In one control schedule, the actuator 30 (FIG. 2A) controls the movement of the slat 24 in a prescribed manner in accordance with azimuth angle Ψ. The actuator 30 may be controlled by a cam arrangement or the like, which drives the slat in a predetermined pattern relative to the azimuth angle Ψ. Preferably, the slat 24 is driven between slat position 6 and slat position 3 in a sinusoidal wave pattern, which has a maximum nose up position near Ψ=90 degrees and a maximum nose down position near Ψ=270 degrees. That is, the slat 24 is at a low drag position (position 3; FIG. 4C) at Ψ=90 degrees, at high lift position (position 6; FIG. 4F) at Ψ=270 degrees and at a base position (approximately position 1; FIG. 4A) at Ψ=0, 180, and 360 degrees. It should be understood that it may not be physically possible to pass exactly through the 3 positions illustrated by FIGS. 4C, 4F and 4A (positions 1, 3 and 6) with a single pivot axis H. With single pivot axis H located to achieve positions 1 and 6, the slat will move through a base position which may differ from that which is illustrated as position 1 (FIG. 4A).

Prescribed motion is based on providing a minimum drag configuration in the high speed region (advancing blade), where drag is more critical for overall rotor performance, while also providing a maximum lift configuration in the lower speed region (retreating blade), where lift is more critical for overall rotor performance. Such a prescribed motion may be defined as, for example only, a once per revolution (1P) sinusoidal motion. A 1P function can be defined as: y=A*sin(1*Ψ), where "A" is the amplitude and "Ψ" is the azimuthal angle. The 1P function provides a smooth continuous curve that starts at zero at Ψ=0 (blade over the tail), grows to an amplitude of "A" at Ψ=90 degrees (FIG. 1; blade pointing directly to the right side—maximum advancing speed), diminishes back to zero at Ψ=180 degrees (blade over the aircraft nose) and then further diminishes to an amplitude of minus "A" at Ψ=270 degrees (FIG. 1; blade pointing directly to the left—minimum speed, called the retreating blade side), and then finally grows back to zero at Ψ=360 degrees which equals Ψ=0 degrees (blade over tail). A 2P (or twice per rev) function: y=A*sin(2*Ψ) provides the same 1P curve shape, only it completes a complete cycle in ½ the azimuth—between Ψ=0 and Ψ=180. So for a single revolution, 2 cycles are achieved—which means two maximum points of amplitude "A," (at 45 degrees and at 225 degrees) and two minimums of amplitude, "–A," (at 135 degrees and at 315 degrees). In a like manner, a 3P function has 3 cycles per rotor revolution and a 4P function 4 cycles per revolution, and so forth. Superimposing and phase shifting of control harmonics can be used to alter the prescribed motion in response to flight condition to provide an optimal response or desired characteristics. That is, 1P prescribed motion may be preferred for one flight condition, while 1P and/or XP may be preferred for another flight condition.

A controller determines the optimal function to alter the prescribed motion schedule being enacted. In this case, however, the rate at which an aircraft changes flight condition (such as speed or altitude) is far below the rotational speed of the rotor, so this more rigid (function mapping) scenario is defined as prescribed control. Further, for prescribed motion a somewhat arbitrary distinction may be defined between "simple" 1P motion (the slat moves to low drag on the advancing side and high lift on the retreating side), and more complex, higher harmonic motion which essentially becomes an arbitrary motion (which can be defined as a sum of harmonics), but is still prescribed without requiring a closed loop feedback system.

Changing of prescribed motions, due to changing from one flight condition to another, has aspects of an active control system. That is, control logic selects one of several predefined prescribed motions based on sensor measurements, such as flight speed and altitude. The "prescribed control" strategy differs from active control, whereby sensor feedback (at rates similar to or higher than rotor speed) is used to change slat motion up to a per rev basis.

Prescribed motion may additionally, or in the alternative, include other prescribed motion functions, such as moving the maximum slat nose up and/or slat nose down positions to other points in the azimuth, and/or sustaining a given deflection for some period, or other motions that optimize defined performance objectives. These additional/alterative motion functions are defined as a sum of sinusoidal motions of different frequencies and phase angles, i.e. how rapidly the sinusoidal motion occurs and the relative starting point of the motion around the azimuth. The "phase" of the function changes the starting point of the motion away from Ψ=0 degrees to any other point, and the sharper a motion gets, the more harmonic functions are required to the limit in which a step change function requires an infinite number of harmonic functions.

For active or adaptive control, sensor data is acquired in real time and as a result of this data, the slat motion is controlled to provide an optimized motion based on predetermined objectives. Slat motion commanded by closed loop control has an arbitrary waveform (within the constraints of the controller basis functions) in addition or alternatively to prescribed motion. Active control tailors the slat movement in real time, as sensor data is acquired and processed through defined algorithms, to meet a defined objective function. This objective function can be made up of multiple performance objectives and tailored for different modes of operation, e.g. a high performance mode, a low noise mode, etc., and for different flight conditions and/or configurations, e.g., hover, forward flight, air-to-air engagement, etc. As stated with regard to prescribed motion, the active control motions are defined in the time context of the order of the blade rotation, i.e. the processing and sensor feedback are at a rate similar to the rotor rotation rate. Implementation of active control may additionally or alternatively include prescribed motion functions in response to base conditions, e.g., forward flight, hover, etc.

Figure 8:
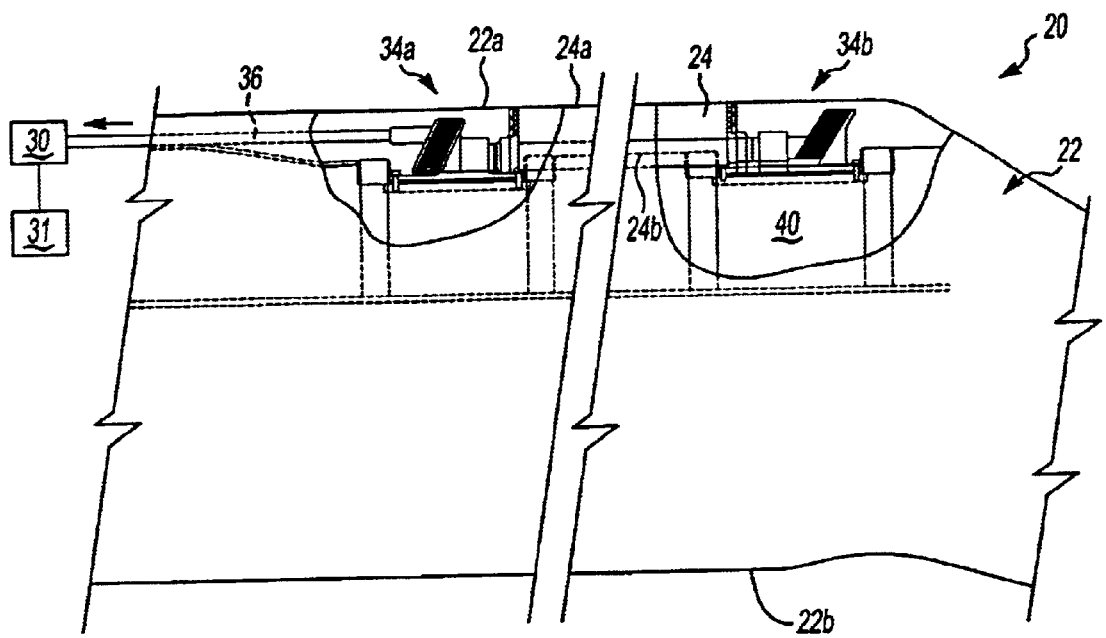
FIG. 8 is a partial sectional plan view illustrating the elastomeric coupler assemblies for a multi-element rotor blade according to the present invention.

Referring to FIG. 8, an expanded view of the multi-element rotor blade 20 illustrates the elastomeric coupler assemblies 34a, 34b that movably support the active slat 24 relative to the main element 22. It should be understood that although described with regard to movement of a multi-element rotor blade virtually any coupling between linear or rotary degrees of freedom including airfoil and non-airfoil members will benefit from the present invention.

Preferably, an inner elastomeric coupler assembly 34a and an outer elastomeric coupler assembly 34b support the slat 24 therebetween. An actuator rod 36 extends within the main element 22, from the blade root portion 23 (FIG. 11) to the inner elastomeric coupler assembly 34a, to actuate the slat 24. Spanwise actuation is particularly desirable, because of multi-element airfoil geometric constraints, structural constraints, and component mounting considerations.

The actuator rod 36 is preferably a tension rod, which is only "pulled" by the actuator 30. Centrifugal force operates to drive the slat 24 to a first position and the actuator rod operates in tension to pull upon the inner elastomeric coupler assembly 34a to drive the slat 24 in opposition to the centrifugal force to a second position. It should be understood that other actuators, which provide other inputs such as a rotational input, will also benefit from the present invention.

Referring to FIG. 9A, an expanded view of the inner and outer elastomeric coupler assemblies 34a, 34b is illustrated. Each elastomeric coupler assembly 34a, 34b includes a grounding member 38 and an active member 40. The grounding member 38 is fixed to the main element 22 by fasteners 42, such as bolts or the like, which extend into the spar 44 of the main element 22. The grounding member 38 is preferably recessed within the leading edge 22a (also illustrated in FIG. 8) toward the spar 44 of the main element 22 such that slat 24 may be at least partially embedded in the platform.

Figure 9B:
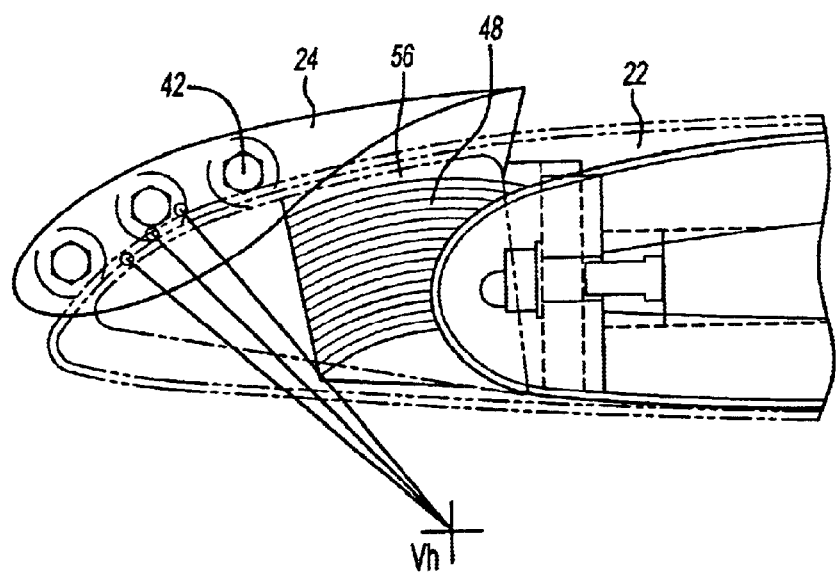
FIG. 9B is a sectional view taken along the line 9B—9B of FIG. 9A.

The active member 40 supports the slat 24. Fasteners 42, such as bolts or the like, secure the active member 40 to a spanwise end of the slat 24 (FIG. 9B). The active member 40 is movably mounted to the grounding member 38 through a helical elastomeric bearing 46, and a first and second elastomeric support bearing 48a, 48b (also illustrated in FIG. 9C).

Figure 10:
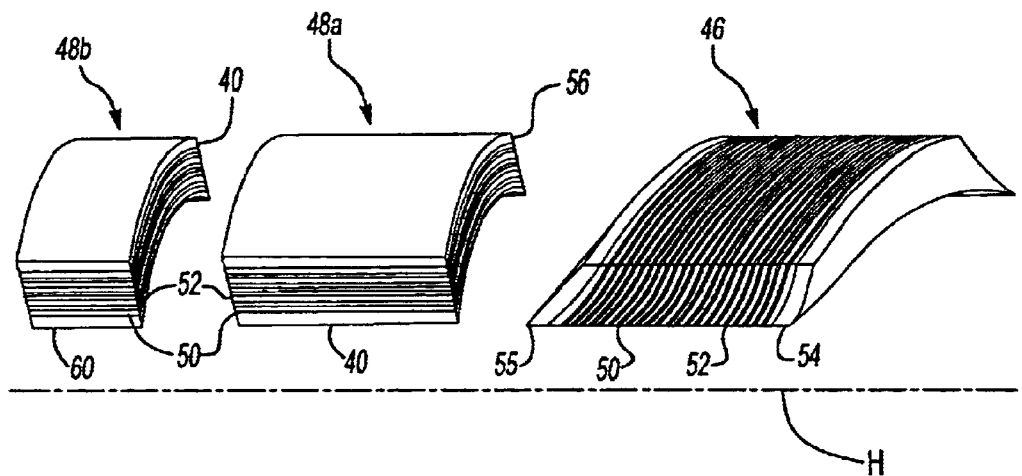
FIG. 10 is a schematic view of the elastomeric bearings illustrating the layer orientation of the helical and support bearings.

The helical elastomeric bearing 46, and the first and second elastomeric support bearings 48a, 48b include a plurality of layers of shear deformable elastomeric material layers 50 separated by helical shim layers 52 formed of high-stiffness constraining material (FIG. 10) such as composite or metallic layers. It should be understood, however, that various materials of differing rigidity will also benefit from the present invention. The helical elastomeric bearing 46 operates as a coupler between the active member 40 and the grounding member 38. Under action of centrifugal force, the shear deformable elastomeric material layers 50 shear within the constraints of the helical shim layers 52 (FIG. 10). The helical shims 52 guide the elastomer shear deformation such that the displacement trajectory of the active member 40 relative to the grounding member 38 is a predefined coupled spanwise-translation and rotation.

The elastomeric bearings 46, 48a, 48b preferably define an arcuate or cupped shape within the plane of the blade section (FIG. 9B) having a focus at the desired virtual hinge point Vh (FIGS. 2D and 9B). The elastomeric bearings 46, 48a, 48b thereby support rotation of the slat 24 about the virtual hinge axis H. As the virtual hinge axis H is not coincident with the slat ¼ chord, slat rotation between two points on an arc about the hinge axis H provides simultaneous rotation of the slat chord and translation of the slat ¼ chord. The arc defined about hinge axis H provides single arc motion preferably between position 3 (FIG. 4C) and position 6 (FIG. 4F). In particular, the slat rotates about the axis H and the motion is completely described by a single arc angle parameter.

In order to achieve slat motion from the desired low drag position (Position 3, FIG. 4C) to the high lift position (Position 6, FIG. 4F), for the current blade geometry, the virtual hinge point is located outside the contour of the main blade section. Depending on the location of Vh, single arc motion between any two other points can be achieved within elastomeric deformation limits. It should be understood that to achieve motion through other predefined positions the virtual hinge point may be located in another position relative the contours.

The grounding member 38 defines a support ramp 54 upon which the helical elastomeric bearing 46 acts against. The support ramp 54 is angled away from the axis H at an acute angle in substantially the same plane of the leading edge 22a and the trailing edge 22b (FIG. 8). That is, the acute angle is formed by the outboard face of the grounding member and the axis H. The support ramp 54 of the inner elastomeric coupler assembly 34a is oriented the same way as the support ramp 54 of the outer elastomeric coupler assembly 34b. That is, the angle defined between axis H and the support ramp 54 of the inner elastomeric coupler assembly 34a faces toward the slat 24, while the same angle between the axis H and support ramp 54 of the outer elastomeric coupler assembly 34b faces away from the slat 24 (FIG. 8).

The support ramp 54 of the inner elastomeric coupler assembly 34a and the outer elastomeric coupler assembly 34b are preferably concave (FIG. 9C). A mating ramp 55 of the active member 40 of the inner elastomeric coupler assembly 34a and the outer elastomeric coupler assembly 34b, which faces the support ramp 54, are preferably convex (FIG. 9C). The helical elastomeric bearing 46 is located between the concave support ramp 54 and the convex mating ramp 55. The purpose of the curvature of the support and mating ramp, elastomeric layers, and high stiffness shim layers, as seen in the plane of the blade (FIG. 9C), is to stabilize the elastomer and thereby stabilize the slat 24.

The elastomeric support bearings 48a, 48b provide motion by shear deformation of the elastomeric layers and carry radial loads in compression against fixed upper and lower support caps 56, 60. The grounding member 38 defines a fixed upper support cap 56 for the first elastomeric bearing 48a, and a fixed lower support cap 60 for the second elastomeric bearing 48b (FIG. 9C). The active member 40 is thereby trapped by the first elastomeric bearing 48a acting upon the upper cap and the second elastomeric bearing 48a acting upon the lower cap 60. The first elastomeric support bearing 48a operates to carry the nominal upward lift upon the slat while the second elastomeric support bearing 48b operates to support the slat in the event that there is a download on the slat. Download may occur when the outboard portion of the main element operates at a negative angle of attack, i.e., when the outboard portion of the blade "digs-in".

Referring to FIG. 10, the helical elastomeric bearing 46, and the elastomeric support bearings 48a, 48b are schematically illustrated relative to the virtual hinge point Vh (axis H), for the outboard bearing assembly. The elastomeric support bearings 48a, 48b are cusped relative to the virtual hinge point such that they define an arc in the plane of the blade section, which has a focus point on the virtual hinge axis H. The layers of the elastomeric support bearings 48a, 48b are arranged substantially parallel to the virtual hinge axis H. That is, a plane which is perpendicular to the virtual hinge axis H would pass through all the layers which define the elastomeric support bearings 48a, 48b.

The first and second elastomeric support bearings 48a, 48b provide a first degree of freedom axially along the virtual hinge axis H. The first and second elastomeric support bearings 48a, 48b provide a second degree of freedom about the virtual hinge axis H, which provides for the rotation of the slat 24 (FIG. 9B) about the virtual hinge axis H. These two degrees of freedom are independent of each other. The radial load capacity of the elastomeric support bearings 48a, 48b depends upon the caps 58, 60 (FIG. 9C), the composition of the layers, and the extent width of the bearing.

The helical elastomeric bearing 46 is cusped such that, as with the elastomeric support bearings 48a, 48b, the helical elastomeric bearing 46 defines an arc (in the plane of the blade section), which has a focal point generally along axis H. The helical elastomeric bearing 46 is layered such that it defines a section of a circular helix, which encircles the virtual hinge axis H. Preferably, the helix is sufficiently spread out spanwise along a +50 degree helix angle, in which adjacent layers are not from one helix locus. That is, the adjacent layers are respective segments of identical spanwise stacked helix loci. Further, as the helical elastomeric bearing 46 is located between the concave support ramp 54 and the convex mating ramp 55, the helical elastomeric bearing 46 is essentially double curved.

The helical elastomeric bearing 46 is layered such that it (as opposed to the elastomeric support bearings 48a, 48b) defines a section of a circular helix. The helical elastomeric bearing 46 and support ramp 54 are angled in the same direction as the helix angle. The layers of the helical elastomeric bearing 46 are arranged substantially about the virtual hinge axis H. That is, a plane which is perpendicular to the virtual hinge axis H would not pass through all the layers of the helical elastomeric bearing 46. The helical elastomeric bearing 46 converts a linear input parallel to the virtual hinge axis H into a rotary output to rotate and translate the slat.

Referring to FIG. 11, the actuator rod 36 is driven by the actuator assembly 30, which preferably includes an actuator 62, such as a hydraulic, pneumatic, electric, mechanical, electromagnetic, piezoceramic actuator, or the like. It should be understood that the actuator 62 may additionally or in the alternative be a mechanically linkage which receives control inputs through a fixed amplitude swashplate or the like. The actuator 62 is preferably located adjacent the blade root portion 23 and drives the actuator rod 36 through a crank 64 to provide mechanical advantage thereto. The crank 64 also reverses the motion of the actuator such that an extension actuator can be mounted with a fixed end inboard. The actuator rod 36 is preferably a tension rod which extends within the main element 22, from the blade root portion 23 to the inner elastomeric coupler assembly 34a, to actuate the slat 24 (FIG. 8).

In operation, centrifugal force operates to slide the slat 24 outboard toward the blade tip. The elastomeric support bearings 48a, 48b of the elastomeric coupler assemblies 34 provide minimal shear resistance to this sliding movement. In the helical elastomeric bearing 46, however, the spanwise outboard sliding motion of the slat 24 acts as an input to the intrinsic helical coupling of the elastomeric bearing 46, resulting in an output rotation of the slat 24. The active member 40 is constrained to move along the helical arc relative to the grounding member 38 by means of incremental shear of the elastomeric layers 50 between the support ramp 54, the respective shim layers 52 and the mating ramp 55. The centrifugal force is reacted through the tension rod 36.

Outboard sliding of the slat 24 is accommodated by the active member 38 and the attached slat 24 moving elastomerically along the helical arc of the helical elastomeric bearing 46 such that the slat 24 rotates nose down. Preferably, maximum travel of the slat is mechanically limited to the fully deployed position 6 (FIG. 4F and FIG. 6) to maximize the coefficient of lift $C_{Lmax}$. This arrangement negates the need for a safety interlock, as in the event of a hardware/software failure the actuator 62 need only be vented and the slat will achieve its fully deployed position. Moreover, as centrifugal force operates to drive the slat to a deployed condition, the slat requires powered activation for only one direction. Nose up pitching moment upon the slat tends to rotate the slat up and the helical coupling will move the slat inboard partially unloading the actuator.

Applicant has determined that a helical elastomeric bearing with a 58 degree helix angle and +−0.5 inches of spanwise travel achieves a 10 degree peak to peak slat rotation about the virtual hinge point Vh.

To retract the slat 24, the actuator 62 operates to place the actuator rod 36 under tension to pull upon the active member 40 of the inner elastomeric coupler assembly 34a. Retraction of the active member 40 relative to the grounding member 38 retracts the slat 24 in opposition to centrifugal force. Preferably, the controller 31 (FIG. 2A) controls the actuator 62 to drive the slat to a desired position under prescribed or active control as described above.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A coupler assembly comprising:
 a fixed member substantially parallel to a first axis;
 a movable member substantially parallel to said first axis; and
 an elastomeric bearing attached between said fixed member and said movable member, said elastomeric bearing comprising a plurality of shear deformable elastomeric layers and a plurality of shim layers, said plurality of shear deformable elastomeric layers displaceable along a trajectory constrained by said plurality of shim layers to translate a linear input to said movable member along said first axis into a rotational output of said movable member about said first axis.

2. The coupler assembly as recited in claim 1, wherein said elastomeric bearing comprises a double curve.

3. The coupler assembly as recited in claim 1, wherein said elastomeric bearing comprises an arc defining a focal point located along said first axis.

4. The coupler assembly as recited in claim 1, wherein said elastomeric bearing forms a portion of a helix.

5. The coupler assembly as recited in claim 4, wherein a focal point of an arc of said helix is located along said first axis.

6. The coupler assembly as recited in claim 1, wherein said movable member moves parallel to said first axis relative to said fixed member to shear said plurality of elastomeric layers along a helical trajectory constrained by said plurality of shim layers.

7. The coupler assembly as recited in claim 1, wherein said plurality of shim layers have a stiffness higher than the stiffness of said shear deformable elastomeric layers.

8. The coupler assembly as recited in claim 1, further comprising a grounding member mounted to said fixed member and an active member mounted to said movable member, said elastomeric bearing mounted to said grounding member and said active member.

9. The coupler assembly as recited in claim 8, further comprising a support ramp extending from said grounding member and a mating ramp extending from said active member, said support ramp and said mating ramp forming an acute angle relative to said first axis, said helical elastomeric bearing attached between said support ramp and said mating ramp.

10. The coupler assembly as recited in claim 9, wherein said support ramp comprises a concave surface and said mating ramp defines a convex surface facing said concave surface, said elastomeric bearing attached between said concave surface and said convex surface.

11. The coupler assembly as recited in claim 8, further comprising an elastomeric load retention bearing mounted to said grounding member and said active member, said elastomeric load retention bearing defines an arc having a focal point located along said first axis.

12. The coupler assembly as recited in claim 11, wherein said elastomeric load retention bearing is under compression when subjected to a force normal to said movable element, said elastomeric retention bearing operable to prevent displacement of said movable member normal to a desired trajectory.

13. The coupler assembly as recited in claim 11, wherein said elastomeric load retention bearing provides a first degree of freedom substantially parallel to said first axis and a second degree of freedom about said first axis, said second degree of freedom independent of said first degree of freedom.

14. The coupler assembly as recited in claim 1, wherein said first axis is located outside a contour defined by said fixed member.

15. The coupler assembly as recited in claim 1, further comprising an actuator axially movable parallel to said first axis to provide linear motions to said elastomeric bearing.

16. A multi-element rotor blade for an aircraft comprising:
   a main element rotatable about an axis of rotation, a first axis substantially parallel to said main element;
   a slat movable relative to said main element, said slat substantially parallel to said first axis;
   a helical elastomeric bearing comprising a portion of a helix, said helical elastomeric bearing attached between said main element and said slat, said slat movable parallel to said first axis to subject said helical elastomeric bearing to an axial force such that said slat moves elastically along an arc defined by said helix about said first axis between a first position and a second position; and
   an actuator rod axially movable parallel to said first axis to provide a linear input to said helical elastomeric bearing to resist said axial force.

17. The multi-element rotor blade as recited in claim 16, wherein said axial force is centrifugal force.

18. The multi-element rotor blade as recited in claim 16, wherein said first axis is located outside a contour defined by said main element.

19. The multi-element rotor blade as recited in claim 18, wherein said actuator rod is placed under tension by a centrifugal force on the slat generated by rotation of said slat and main element about said axis of rotation.

20. The multi-element rotor blade as recited in claim 16, wherein said helical elastomeric bearing forms a portion of a helix, an arc of said helix defining a focal point located along said first axis.

21. The multi-element rotor blade as recited in claim 16, wherein said main element is rotatable about an axis of rotation to define an azimuth angle, said azimuth angle including an advancing angle between 0 and 180 degrees and a retreating angle between 180 and 360 degrees, said slat movable between a first position during said advancing angle and a second position during said retreating angle.

22. The multi-element rotor blade as recited in claim 21, wherein said second position includes translation relative to a base position.

23. The multi-element rotor blade as recited in claim 21, wherein said slat defines a base position relative said main element, said first position includes a positive rotation relative to said base position and said second position including a negative rotation relative said base position.

24. The multi-element rotor blade as recited in claim 23, wherein said positive rotation is approximately +5 degrees of rotation from said base position and said negative rotation is approximately −7.5 degrees of rotation from said base position.

25. A method of movably coupling a movable member to a fixed member comprising the steps of:
   (1) mounting a helical elastomeric bearing forming a portion of a helix between a fixed member and a movable member, said movable member movable relative to said fixed member and a first axis defined parallel to the movable member and the fixed member, said movable member moving parallel to said fist axis;
   (2) subjecting said helical elastomeric bearing to an axial force such that the movable member moves about said first axis from a first position to a second position; and
   (3) resisting said axial force such that said movable member moves about the first axis to return to the second position.

26. A method as recited in claim 25, wherein the axial force is a centrifugal force.

27. A method as recited in claim 25, wherein the movable member moves elastically along an arc defined by the helix.

28. A method as recited in claim 25, wherein the movable member pitches about said first axis.

29. A method as recited in claim 25, wherein the movable member translates relative to said first axis.

30. An elastomeric bearing assembly comprising:
   a plurality of shear deformable elastomeric layers; and
   a plurality of shim layers, said plurality of shear deformable elastomeric layers displaceable along a trajectory constrained by said plurality of shim layers to translate an input along a first degree of freedom into an output along a second degree of freedom, said second degree of freedom different from said first degree of freedom.

31. The elastomeric bearing assembly as recited in claim 30, wherein said first degree of freedom comprises a linear degree of freedom and said trajectory comprises a rotary degree of freedom.

32. The elastomeric bearing assembly as recited in claim 30, wherein said first degree of freedom comprises a rotary degree of freedom and said trajectory comprises a linear degree of freedom.

33. The elastomeric bearing assembly as recited in claim 30, further comprising an actuator to drive said plurality of shear deformable elastomeric layers along said trajectory.

34. The elastomeric bearing assembly as recited in claim 30, wherein said plurality of shim layers comprise a portion of a helix.

* * * * *